April 30, 1968   B. BASSAN ETAL   3,380,479
VALVE ASSEMBLY AND ACTUATING LINKAGE THEREFOR
Filed Oct. 23, 1965   2 Sheets-Sheet 1

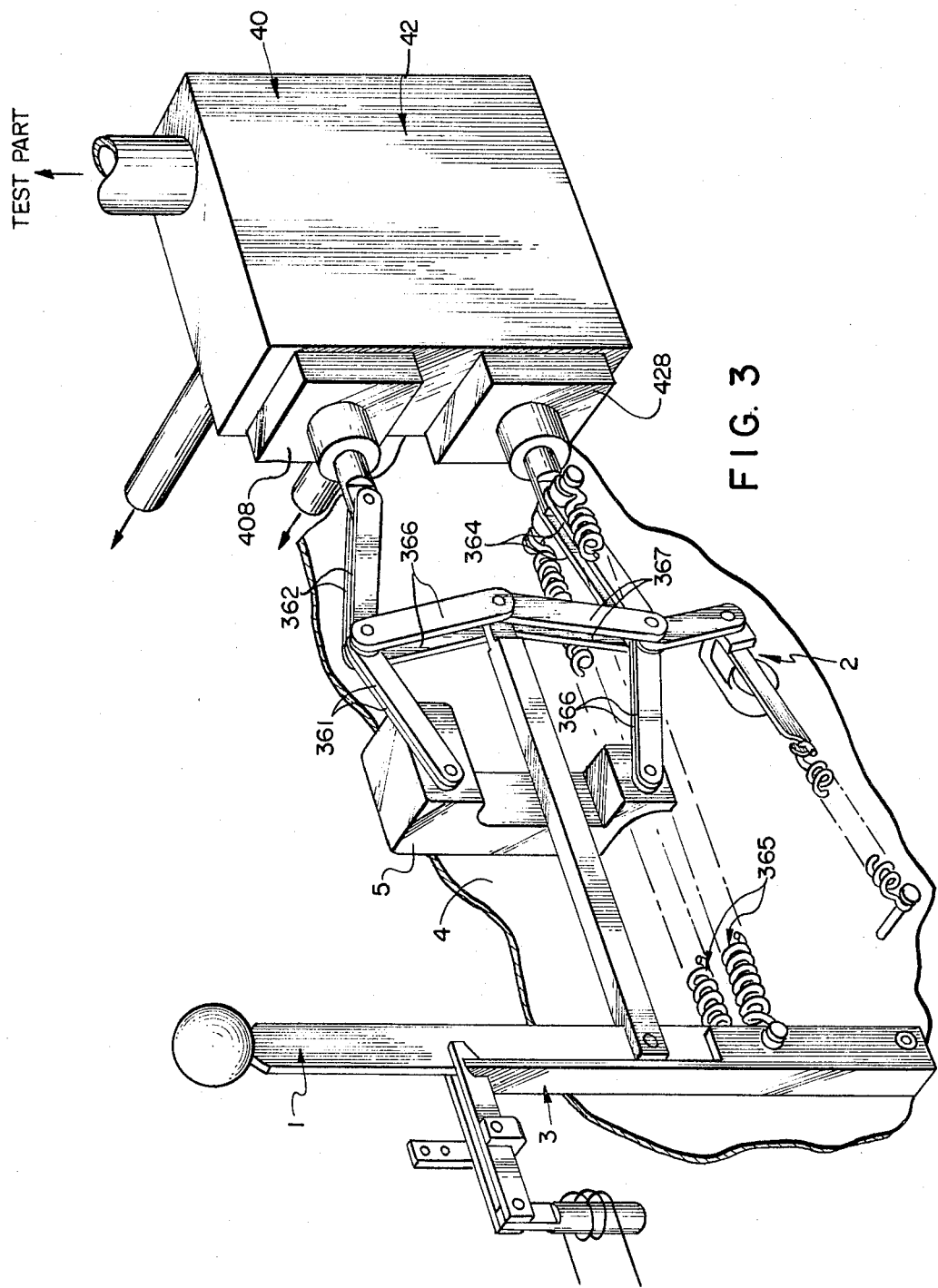

United States Patent Office 3,380,479
Patented Apr. 30, 1968

3,380,479
VALVE ASSEMBLY AND ACTUATING
LINKAGE THEREFOR
Benjamin Bassan, Framingham, and Walton E.
Briggs, Lynnfield, Mass., assignors to National
Research Corporation, Cambridge, Mass., a corporation of Massachusetts
Filed Oct. 23, 1965, Ser. No. 503,744
9 Claims. (Cl. 137—627.5)

The present invention relates to valves and operating structure therefor and particularly to the high vacuum valves described in the copending application of Briggs, S.N. 406,508, filed Oct. 26, 1964 now abandoned.

In the said copending application Briggs describes a sequencing valve assembly comprising first and second valves with first and second valve stems, respectively, operated via first and second toggle joints, respectively. The said first and second toggle joints are interconnected via a third toggle joint. Actuating means are connected to said toggle linkage for opening the first and second valves in sequence and closing the valves. The valves are of the bellows block type and the linkage comprises pre-loaded springs for transferring a uniform seating pressure to each of the valves notwithstanding small dimensional variations and changes in the linkage due to manufacturing tolerances and wear.

It is the principal object of the present invention to provide an improved construction of said dual valve assembly and operating linkage therefor having the advantage of extremely long operating life, high reliability, and characterized by the use of inexpensive interchangeable components.

We achieve this object through the combination of the following principal features:

(1) The actuating stems of the valves being mounted in long bearing tubes of a length between approximately 2 and 3 times the diameter of the stem to avoid canting due to the moment imposed by operation of the toggle linkage, (2) The preload springs being mounted at the forward end of the valve stems between the stems and valving members;

(3) The lever arms of the toggle linkage each consisting of a pair of lever members symmetrically distributed about a plane passing through the valve stems and the linkage including tension springs also symmetrically distributed about the plane.

Other objects, features and advantages will, in part, be obvious and will, in part, appear hereinafter.

The invention is now described in detail with respect to our preferred embodiment and with reference to the drawings, wherein:

FIG. 3 is an isometric view of a portion of the valve assembly and linkage showing our improvements therein, in addition to that described in connection with FIG. 2.

Figure 1:
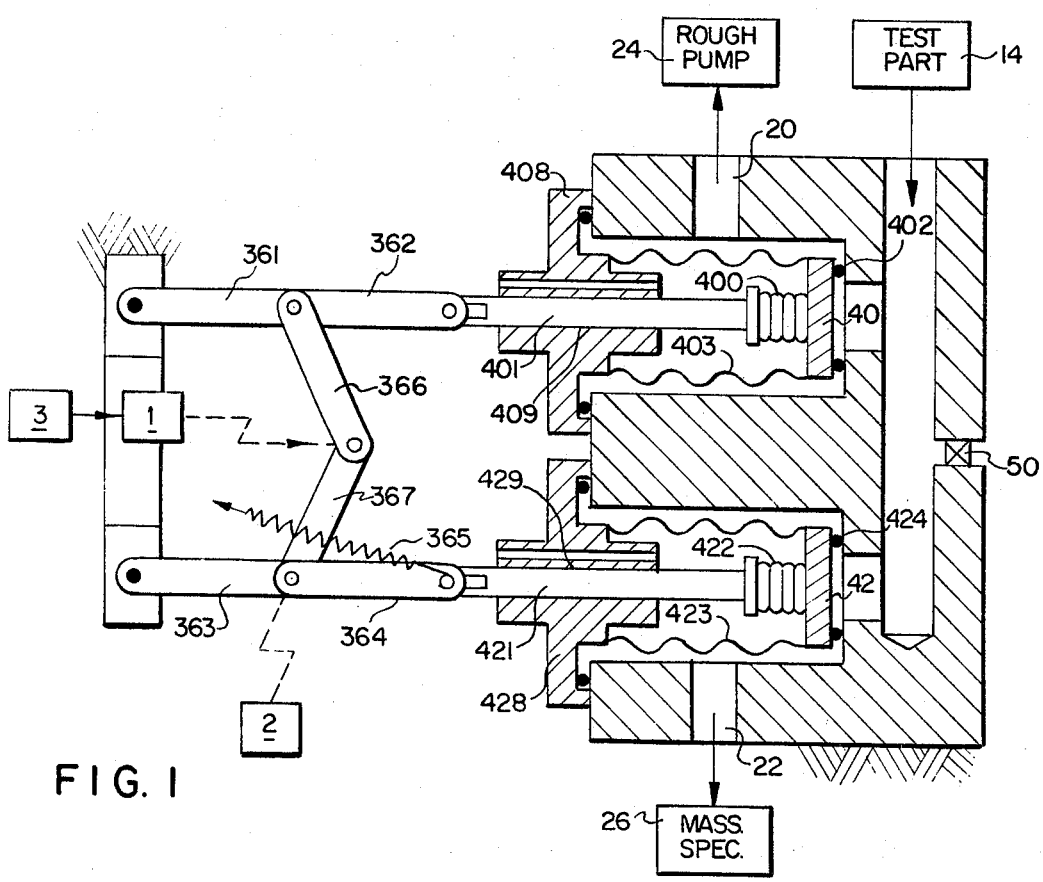
FIG. 1 is a schematic, partially sectional diagram of the dual valve assembly and operating linkage therefor and showing one possible usage of such structure.

In FIG. 1 is shown one basic combination in which the dual valve assembly of our invention is employed in its preferred usage. This is the leak testing of sealed walls such as in transistor casings, heat exchange apparatus, bulbs, etc. The test part is indicated at 14 in the drawing. The environment within or around the test part is evacuated by a rough pump 24. Then, when the vacuum has been reduced to a level compatible with mass spectrometer operation, the test part is connected to a mass spectrometer 26. Probe gas is applied to the test part and escape of the probe gas, as detected by the mass spectrometer, indicates leakage.

The sequential connection of the test part to the rough pump and then to the mass spectrometer is controlled through a first valve 40 and a second valve 42 which control access to the rough pump and mass spectrometer through exit ports 20 and 22, respectively. According to the invention described in the above-cited application of Briggs, operation of the valves 40 and 42 is controlled through a mechanical linkage 36 which comprises a first toggle joint consisting of lever arms 361 and 362, a second toggle joint consisting of lever arms 363 and 364, the first and second toggle joints being interconnected by a third toggle joint consisting of lever arms 366 and 367. Three actuating systems 1, 2, and 3, are operative upon this linkage to provide the required control. The actuating system 1 consists of a simple pivoted handle connected to the central pivot of the third toggle joint. The operator pulls this handle to straighten out the third toggle joint and fold the first toggle joint (the second joint being restrained by the second actuator described below). The movement of the first toggle joint opens valve 40, thus connecting the test part 14 to the rough pump 24 for evacuation. The second actuator consists of a motor for driving the linkage at a preset speed through a crank connected to the second toggle joint. After the evacuation step is completed, the second actuator folds the second toggle joint which transmits its motion to the first toggle joint, via the third toggle joint, thereby closing valve 40 as valve 42 opens. The test part is thus connected to the mass spectrometer 26 and its pumping system (not shown) and ready for testing. The air pressure differential across valve 42 is counterbalanced by spring means 365, which are connected to a fixed point or preferably to the third actuating system as described below. For purposes of illustration, spring 365 is deflected from its true position in FIG. 1. Actually, the spring is arranged adjacent the lever arms 363 and 364 for maximum efficiency. This is more clearly shown in FIG. 3 below.

After the testing operation, the first actuating system 1 is used by the operator to return the linkage to its FIG. 1 arrangement thus shutting both valves. In the event of an emergency pressure rise at any time, the third actuating system automatically operates the first actuating system to provide the valve closing operation. The third actuator consists of a spring loaded drive for moving the linkage to the valve closing position. The actuating systems are further described in the said application of Briggs. Reference is also made to the Briggs application for other details such as an actuating linkage for an air release valve 50 for restoring atmospheric pressure to the valve assembly.

Motion is transmitted between the linkage 36 and the valves 40 and 42 via preloaded springs 400 and 422, respectively. The springs are set to apply a seating pressure of about 35 p.s.i. to the valves 40 and 42. This seating pressure on O-rings 412 and 424 of the valves assures a good seal with the requisite degree of vacuum tightness. The actuating stem of each valve and its spring are surrounded by a metal bellows.

The structural elements of the valve assembly and operating linkage thus far described may be summarized as:

(a) A first reciprocating bellows sealed valve 40 with an actuating stem 401 and a preloaded spring 400, (b) A second repricating bellows sealed valve 42 with an actuating stem 421 and a pre-loaded spring 422 and a linkage for actuating the valves comprising:

(c) A first toggle joint 361, 362 connected to the actuating stem of said first valve, (d) A second toggle joint 363, 364 connected to the actuating stem of said second valve, (e) A third toggle joint 366, 367 connected between intermediate pivots of said first and second toggle joints.

Our invention, now particularly described below, provides improvements in the basic structure described above affording a high reliability.

Figure 2:
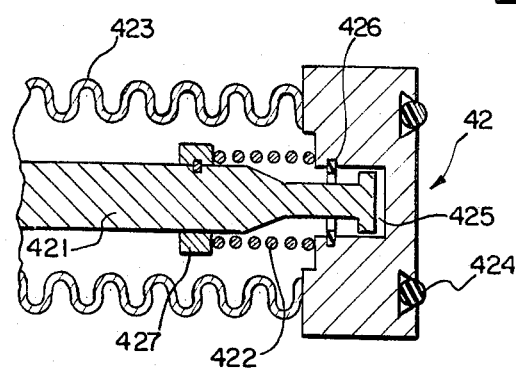
FIG. 2 is a sectional view of a portion of one valving member showing the arrangement of the pre-loaded spring.

Referring to FIGS. 1 and 2, it can be seen that the springs 400, 422 are located at the forward ends of the actuating stems 401, 421. In FIG. 2, valve 42 is shown in more detail and is typical of both valves. The forward end of stem 421 is received in a recess 425 of the valve head and prevented from escape by a ring 426. The spring 422 is mounted between a flange 427 and the valve head and surrounding the valve stem.

Referring again to FIG. 1, each valve has a cover 408, 428 containing a long bearing 409, 429 for actuating stems 401, 421, respectively. The length of each of the bearings is at least equal to the axial length of travel of its associated valve head and preferably two to three times the stem diameter.

Referring to FIG. 3, the linkage is shown in the stage of operation wherein valve 40 is being closed and valve 42 being opened under the actuating force of a crank 2 driven by a motor (not shown). The air pressure differential across valve 40 assists in this actuation. The entire linkage is mounted on a chassis plate 4 and a fulcrum block 5 mounted on the plate supports the fixed pivots of the first and second toggle joints. Each lever arm of the joints 361, 362, etc., consists of a pair of links symmetrically arranged with respect to the central plane of motion of the valves. Additionally, the spring means 365 consists of a pair of symmetrically arranged springs. All the links 361, 362, 363, 364, 366, 367 are of equal length. We have also found that the pair of springs 365 can perform two jobs—(1) counterbalancing the pressure differential across valve 42 and (2) transmitting a rapid driving force to the third actuator 3 when the design of FIG. 3 is used. As shown in FIG. 3, the actuator 3 consists of a pivoted bar 3 which is normally restrained by a latch. When the latch is released, the bar 3 pushes the control handle 1 forward to move the linkage to the valve closing position. At the same time, the pressure differential across the second valve, subjected to less resistance from springs 365, pulls the linkage directly.

The above-described structural features provide a high degree of reliability and extraordinarily long components lifetime. A valve assembly incorporating the above features was built and operated through 900,000 cycles without failure of any of the links or valve parts, other than metal bellows. The O-rings were repeatedly sealed to the requisite degree of vacuum tightness.

What is claimed is:
1. An improved high vacuum valve assembly and operating linkage therefor, comprising, in combination:
 (a) a first reciprocating bellows valve with an actuating stem loosely connected to a bellows valve at the forward end of the stem, a flange extending outwardly from the stem, a pre-loaded spring between said flange and the valve head, a metal cover, a metal bellows extending from said cover to the valve head and surrounding the spring, an elongated bearing in said cover accommodating the actuating stem, the length of the bearing being at least twice the diameter of the valve stem,
 (b) a second reciprocating bellows valve constructed like the said first valve and having a direction of valving motion parallel to the first valve whereby the axes of motion of the first and second valves lie in a common plane,
 (c) a first toggle joint connected between a fixed pivot and the actuating stem of said first valve and comprising a pair of lever arms with a common intermediate pivot, each lever arm consisting of a pair of links symmetrically arranged about said plane of motion,
 (d) a second toggle joint connected between a fixed pivot and the actuating stem of said second valve and constructed like said first toggle joint, and
 (e) a third toggle joint connected between the intermediate pivots of said first and second toggle joints and constructed like said first and second toggle joints.

2. The apparatus of claim 1 wherein the length and form of all said links is identical.

3. The apparatus of claim 1 wherein the links of a lever arm in said first toggle joint and of a corresponding lever arm in said second toggle joint are abutting.

4. An improved valve assembly and linkage therefor comprising, in combination, the elements (a) and (c) of claim 1.

5. The apparatus of claim 1 further comprising a pair of springs symmetrically distributed about said plane and connected to the second valve and constructed and arranged to provide a valve opening force to said valve.

6. An improved high vacuum valve assembly and operating linkage therefor, comprising, in combination:
 (a) a first reciprocating high vacuum valve,
 (b) a second reciprocating high vacuum valve,
 (c) a first joint connected to said first valve,
 (d) a second joint connected to said second valve,
 (e) a third joint interconnecting said first and second joints to form a complete linkage,
 (f) a first actuator connected to the third joint,
 (g) a second actuator connected to said second joint,
 (h) a third actuator member constructed and arranged to follow the same path of motion as the first actuator and to drive said first actuator, when in motion, and further comprising spring means connected between the third actuator member and the second valve and latch means for restraining the third actuator.

7. An improved high vacuum valve assembly and operating linkage therefor comprising, in combination:
 (a) a first reciprocating valve,
 (b) a second reciprocating valve having a direction of motion parallel to that of the first linkage,
 (c) a first toggle joint connected to the first valve and comprising a pair of lever arms with a common intermediate pivot, each lever arm consisting of a pair of links symmetrically arranged about said plane of motion,
 (d) a second toggle joint connected to the second valve and constructed like said first joint,
 (e) a third toggle joint connected between the intermediate pivots of said first and second toggle joints and constructed like said first and second toggle joints,
 (f) a first actuator connected to the intermediate pivot of said third toggle joint,
 (g) a second actuator connected to the intermediate pivot of said second toggle joint, and
 (h) a pair of springs symmetrically distributed about the said plane, connected to the second valve and constructed to apply a valve opening force to said second valve.

8. An improved high vacuum valve assembly and operating linkage therefor, comprising, in combination:
 (a) a first reciprocating valve,
 (b) a second reciprocating valve having a direction of motion parallel to that of the first linkage, to thereby define a plane of motion,
 (c) a first toggle joint connected to the first valve and comprising a pair of lever arms with a common intermediate pivot, each lever arm consisting of a pair of links symmetrically arranged about said plane of motion,
 (d) a second toggle joint connected to the second valve and constructed like said first joint,
 (e) a third toggle joint connected between the intermediate pivots of said first and second toggle joints and constructed like said first and second toggle joints, (f) a first actuator connected to the intermediate pivot of said third toggle joint, (g) a second actuator connected to the intermediate pivot of said second toggle joint, and (h) a third actuator member constructed to move the first actuator.

9. The apparatus of claim 8 wherein said third actuator member (h) is connected to the second valve via a pair of springs symmetrically distributed about the said plane.

References Cited

UNITED STATES PATENTS 2,205,684   6/1940   Cochran _____ 137—607 X
3,242,945   3/1966   Nash _____ 137—636 X CLARENCE R. GORDON, *Primary Examiner.*